United States Patent
Shockling et al.

(10) Patent No.: US 11,170,073 B2
(45) Date of Patent: Nov. 9, 2021

(54) SEQUENTIAL EMBEDDING STATISTICAL ANALYSIS FOR MULTIDIMENSIONAL TOLERANCE LIMITS

(71) Applicant: Westinghouse Electric Company LLC, Cranberry Township, PA (US)

(72) Inventors: Michael A. Shockling, Gibsonia, PA (US); Brian P. Ising, Mars, PA (US); Kevin J. Barber, Cranberry Township, PA (US); Scott E. Sidener, Lexington, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 556 days.

(21) Appl. No.: 16/015,886

(22) Filed: Jun. 22, 2018

(65) Prior Publication Data

US 2019/0065438 A1    Feb. 28, 2019

Related U.S. Application Data

(60) Provisional application No. 62/549,847, filed on Aug. 24, 2017.

(51) Int. Cl.
     *G06F 17/18*      (2006.01)

(52) U.S. Cl.
     CPC ................... *G06F 17/18* (2013.01)

(58) Field of Classification Search
     CPC ...................................................... G06F 17/18
     See application file for complete search history.

(56) References Cited

U.S. PATENT DOCUMENTS

| 5,956,251 A * | 9/1999 | Atkinson ............... G07C 3/14 700/109 |
| 6,065,119 A * | 5/2000 | Sandford, II .......... G06F 21/64 726/22 |
| 2007/0213959 A1 * | 9/2007 | Kropaczek .............. G21D 3/04 703/1 |
| 2008/0154838 A1 | 6/2008 | Watford et al. |

(Continued)

FOREIGN PATENT DOCUMENTS

| EP | 2643781 B1 | 6/2017 |
| KR | 101687169 B1 | 12/2016 |

OTHER PUBLICATIONS

Frepoli, Cesare. "An overview of Westinghouse realistic large break LOCA evaluation model." Science and Technology of Nuclear Installations 2008 (2008). (Year: 2008).*

(Continued)

*Primary Examiner* — Chuen-Meei Gan
(74) *Attorney, Agent, or Firm* — K&L Gates LLP (57) ABSTRACT

The invention relates to statistical processing of multi-dimensional samples according to a step-wise sequence of iterative tolerance limit definitions using rank statistics. The processing is performed in the context of defining tolerance limits for a population that are compared to multiple process limits or acceptance criteria, with the requirement that a specified fraction of the population be confirmed to fall within the stated acceptance criteria. The symmetry (or asymmetry) may be allocated and controlled by selecting the frequency of occurrence of a specific figure of merit, and its order or position, in the sequential embedding processing sequence.

4 Claims, 4 Drawing Sheets

(56) References Cited

U.S. PATENT DOCUMENTS

2012/0185222 A1* 7/2012 Frepoli .......... G21D 3/001 703/2
2018/0190399 A1 7/2018 Kim et al.

OTHER PUBLICATIONS

Guba, Attila, Mihály Makai, and Lénárd Pál. "Statistical aspects of best estimate method—I." Reliability engineering & system safety 80, No. 3 (2003): 217-232. (Year: 2003).*

Dai, Hanjun, Ramzan Umarov, Hiroyuki Kuwahara, Yu Li, Le Song, and Xin Gao. "Sequence2vec: a novel embedding approach for modeling transcription factor binding affinity landscape." Bioinformatics 33, No. 22 (2017): 3575-3583. (Year: 2017).*

Asko Arkoma et al., Statistical analysis of fuel failures in large break loss-of-coolant accident (LBLOCA) in EPR type nuclear power plant, Apr. 15, 2015, pp. 1-33.

Hongbin Zhang et al., Comparisons of Wilks' and Monte Carlo Methods in Response to the 10CFR50.46(c) Proposed Rulemaking, The 11th International Topical Meeting on Nuclear Reactor Thermal Hydraulics, Operation and Safety, Gyeongju, Korea, Oct. 9-13, 2016, pp. 1-12.

International Search Report and Written Opinion for International PCT Application No. PCT/US2018/039695, dated Oct. 12, 2018.

Milks, S. S., 1941, "Determination of Sample Sizes for Selling Tolerance Limits", The Annuals of Mathematical Statistics, vol. 12, pp. 91-96.

Wald, A., "An Extension of Wilks' Method for Setting Tolerance Limits", The Annuals of Mathematical Statistics, vol. 14, pp. 45-55.

Guba, Makai, and Pal, 2003, "Statistical Aspects of Best Estimate Method—I", Reliability Engineering and System Safety, 80, pp. 217-232.

Martin et al., Perspectives on the application of order-statistics in best-estimate plus uncertainty nuclear safety analysis (2011), 241(1):274-284.

Frepoli, An Overview of Westinghouse Realistic Large Break LOCA Evaluation Model (2008), 12(1):1-15.

* cited by examiner

\# SEQUENTIAL EMBEDDING STATISTICAL ANALYSIS FOR MULTIDIMENSIONAL TOLERANCE LIMITS

CROSS-REFERENCE TO RELATED APPLICATIONS

This application claims priority under 35 U.S.C. § 119(e) to U.S. Provisional Patent Application Ser. No. 62/549,847, filed Aug. 24, 2017, entitled "Sequential Embedding Statistical Processing Technique for Multidimensional Tolerance Limits", which is herein incorporated by reference.

BACKGROUND

1. Field

The invention relates to the statistical processing of a multidimensional sample in which symmetry (or asymmetry) is allocated and controlled among the dimensions according to a step-wise sequence of iterative tolerance limit definitions using rank statistics. The processing is performed in the context of defining tolerance limits for a population that can be compared to multiple process limits or acceptance criteria, with the requirement that a specified fraction of the population be confirmed to fall within the stated acceptance criteria.

2. Related Art

Fundamentals of non-parametric order statistics for use in defining tolerance limits for a population were established in Wilks (Wilks, S. S., 1941, "Determination of Sample Sizes for Setting Tolerance Limits," The Annals of Mathematical Statistics, Vol. 12, pp. 91-96) which is hereby incorporated by reference in its entirety herein. The Wilks (1941) technique uses rank statistics of a random sample taken from a larger population. The rank statistics represent upper and lower tolerance limits for a desired fraction of the population. Wilks (1941) proves a means for calculating a confidence level associated with those tolerance limits, given the sample size, choice of rank(s), and desired fraction of the population. The technique described in Wilks (1941) can be applied to problems of manufacturing, where a fraction of a population must meet a specified production process limit, or to problems of analysis, where a fraction of a population of calculated results must meet a specified acceptance criterion.

The theory of Wilks (1941) was extended to consider multi-dimensional populations by Wald (Wald, A., 1943, "An Extension of Wilks' Method for Setting Tolerance Limits," The Annals of Mathematical Statistics, Vol. 14, pp. 45-55) which is hereby incorporated by reference in its entirety herein, wherein tolerance limits are defined for each dimension of the population. Similar to Wilks (1941), Wald (1943) provides and proves a methodology to calculate the confidence level. The Wald (1943) work was reformulated by Guba, Makai, and Pal (Guba, Makai, and Paul, 2003, "Statistical Aspects of Best Estimate Method-I," Reliability Engineering and System Safety, 80, pp. 217-232) which is hereby incorporated by reference in its entirety herein, specifically for nuclear safety applications, where a Loss of Coolant Accident (LOCA) analysis considers a three-dimensional population of LOCA results. The LOCA accident scenario involves peak cladding temperature (PCT), maximum local oxidation (MLO), and core-wide oxidation (CWO) results. The goal of the LOCA analysis is to identify a specified fraction (typically 95%) of the population of predicted results from a Monte Carlo style uncertainty analysis that is confirmed to satisfy the acceptance criteria, with a specified confidence level (typically 95%).

The method of Wald (1943) may be applied according to the following process:

(1) Establish either a physical process with variation in outputs with unknown uncertainty distribution or a computational process for which outputs can be simulated assuming variation in inputs with well characterized uncertainty distributions;

(2) Draw either a random sample from the physical process or generate a random sample of computational simulations using Monte Carlo sampling of input uncertainties; and (3) Establish upper and/or lower tolerance limits based on rank statistics of the sample.

From Wald (1943), the sample size, the fraction of the population bounded by the tolerance limits, the confidence level, and the rank statistics used to define the tolerance limits in each dimension are related through proven mathematical formulae.

The theorems of Wald (1943) assume "embedding" is used to process the sample and define the tolerance limits for each dimension in order. In at least one respect, the embedding can be said to be inherent in the derivation and proof of the mathematical theory. Application of the mathematical theory includes ranking the sample with respect to the first dimension, and defining tolerance limits with respect to a first dimension using an upper rank and lower rank. Then a smaller subset of the original sample is defined as those points within the established tolerance limits (with respect to the first dimension), and the smaller subset is ranked with respect to a second dimension. From the smaller subset, new ranks are used to define the tolerance limits in the second dimension. The ranks are based on the subset used for that particular dimension, which reflects prior embedding steps. The process is repeated for the remaining dimensions. P steps are taken wherein tolerance limits are defined for the P dimensions in succession.

In the example of the LOCA analysis, the sample of simulations may be first ranked with respect to the calculated results for PCT, with an upper tolerance limit set based on a rank statistic. The remaining simulations with PCT less than the established upper tolerance limit may be ranked with respect to MLO, allowing an MLO tolerance limit to be set. Similarly, a CWO limit is also set. Finally, the tolerance limits for PCT, MLO, and CWO are compared with the acceptance criteria to determine whether the desired proportion of the population falls within (e.g., satisfies) the criteria.

A potential shortcoming of this approach is the tolerance limits are asymmetric in terms of how bounding they might be for each individual dimension. The dimension chosen first will have tolerance limits based on the entire sample. Each successive dimension will be based on successively smaller portions of the original sample.

This shortcoming was acknowledged in Wald (1943): "The construction of the tolerance limits . . . as proposed here, is somewhat asymmetric, since it depends on the order of the variates [dimensions] . . . it would be desirable to find a construction which is entirely independent of the order of the variates."

There is a need in the art to design and develop a statistical process to assess a multidimensional sample wherein symmetry may be controlled among the various dimensions, and the results are independent of the order of the dimensions. According to the invention, the process includes a step-wise sequence of iterative tolerance limit definitions using rank statistics to define tolerance limits for a population for comparison to acceptance criteria.

SUMMARY

In one aspect, the invention includes a computational method of establishing tolerance limits for a population with multiple figures of merit. The method includes defining the figures of merit; establishing acceptance criteria for the figures of merit; establishing a required fraction of the population, $\gamma$, to satisfy the acceptance criteria; establishing a required confidence level, $\beta$, for the tolerance limits; confirming that the required fraction of the population, $\gamma$, satisfies the acceptance criteria, which includes defining a number of observations, N, to comprise a sample of the population; calculating a number of steps, K, in a sequential embedding sequence; processing the sample according to the sequential embedding sequence such that the required fraction of the population, $\gamma$, is bounded by the tolerance limits with the required confidence level, $\beta$:

$$\beta = 1 - I(\gamma, N - K + 1, K) = \sum_{j=0}^{N-K} \binom{N}{j} \gamma^j (1-\gamma)^{N-j}$$

where $$K = \Sum_{i=1}^{P} k_i$$

wherein, $\beta$ is confidence level, $\gamma$ is fraction of the population bounded by the tolerance limits, N is the number of observations in the sample, $k_i$ represents the total number of steps in the sequential embedding sequence allocated to each dimension, and K represents the total steps taken in the sequential embedding sequence. The method further includes selecting the figures of merit for which upper and/or lower tolerance limits are defined for each step in the sequential embedding sequence; randomly drawing N observations from the population to comprise the sample; establishing upper and/or lower tolerance limits for each of the figures of merit; (a) for each step in the sequential embedding sequence, defining the upper and/or lower tolerance limits for the figure of merit as defined in a current step of the sequential embedding sequence, which includes ranking the observations in the sample according to their values for the figure of merit; defining upper and/or lower tolerance limits for the figure of merit as the value of the figure of merit for the highest and/or lowest, respectively, ranked observation in the sample; and reducing the sample for subsequent steps of the sequential embedding sequence by discarding the observation used to define the tolerance limit in the current step; (b) repeating the actions of (a) in an iterative step-wise order for the K steps in the sequential embedding sequence to define a final set of upper and/or lower tolerance limits for the multiple figures of merit defined for the population; and confirming if the final tolerance limits satisfy the acceptance criteria.

The figure of merits may be PCT, MLO and CWO for a LOCA analysis.

In certain embodiments, the tolerance limits for a specified figure of merit are optimized by assigning more appearances and later appearances of the specified figure of merit in the sequence.

In certain embodiments, asymmetry is controlled by the frequency and positioning of each figure of merit in the iterative sequence steps. For example, asymmetry may be minimized by assigning equal appearances to each of the figure of merit in the iterative sequence steps and rotating or re-positioning the figures of merit in the iterative sequence steps.

BRIEF DESCRIPTION OF THE DRAWINGS

A further understanding of the invention can be gained from the following description of the preferred embodiments when read in conjunction with the accompanying figures in which.

DESCRIPTION OF THE PREFERRED EMBODIMENTS

The invention relates to the statistical processing of a multi-dimensional sample in which symmetry (or asymmetry) is allocated and controlled among the dimensions according to a step-wise sequence of iterative tolerance limit definitions using rank statistics. Established non-parametric statistics theorems govern the confidence level when defining tolerance limits for multi-dimensional populations. The established embodiment of the theorem is, in at least one respect, an "embedding" technique in which the tolerance limits are defined for each dimension in order. A tolerance limit, or tolerance limits, is established to bound some portion of the population with respect to one dimension, and then subsequent limits are established for subsequent dimensions. If there are P dimensions, then P sets of upper and/or lower tolerance limits are established in P "embedding" steps.

Figure 1:
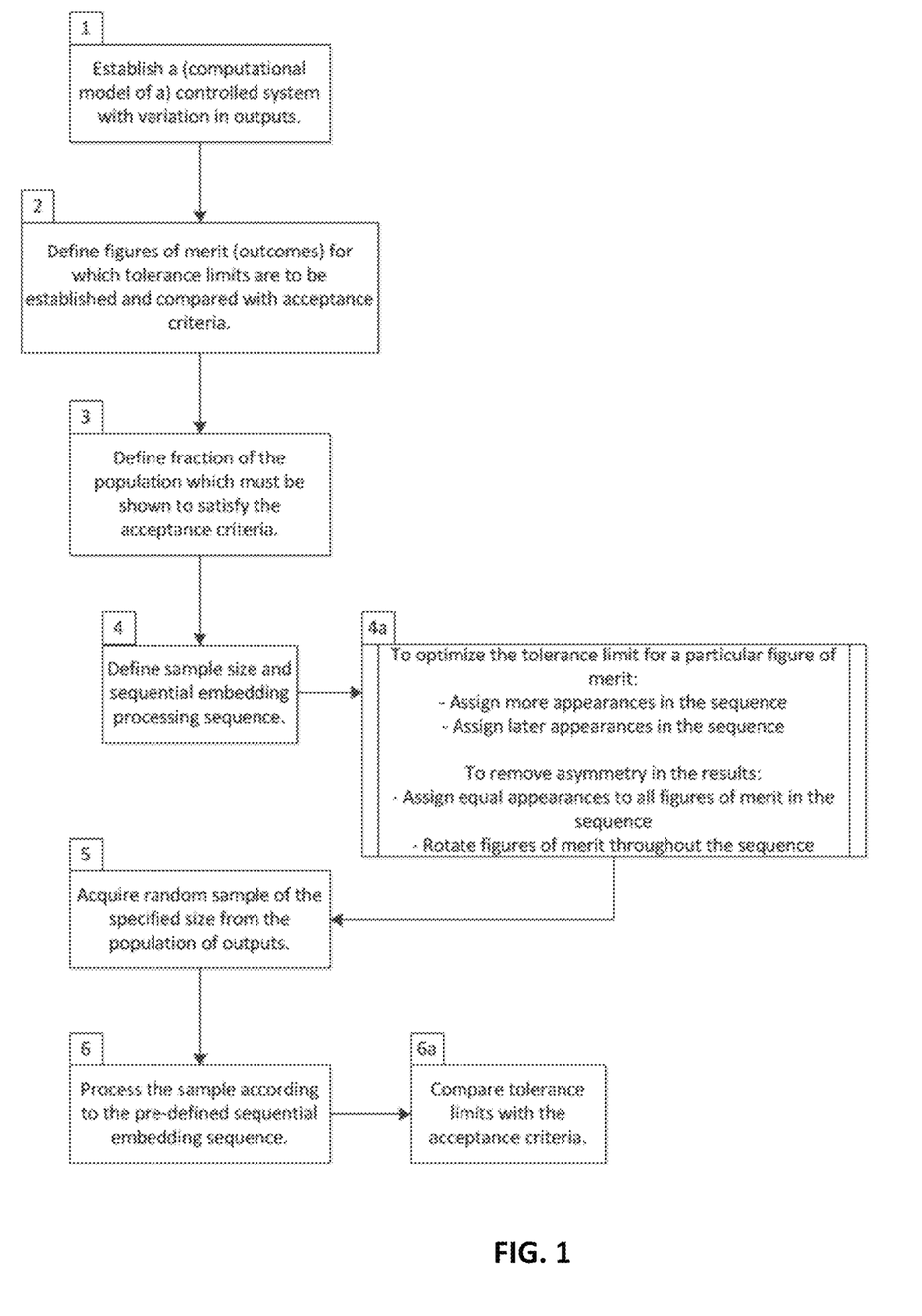
FIG. 1 is a block diagram that shows a process methodology, in accordance with certain embodiments of the invention.

The invention is, in at least one respect, a methodology relying on the use of a "sequential embedding" technique in which the tolerance limits are iteratively updated among the multiple dimensions according to a pre-defined sequence. FIG. 1 illustrates a process methodology in accordance with certain embodiments of the invention. In the methodology, a controlled process or system, such as a manufacturing process, is established. According to (1) in FIG. 1, a controlled process/system or a computational model of the controlled process/system is established. In a more particular embodiment, the process can be a computational simulation of an event or scenario, such as a LOCA accident for a nuclear power plant, where there exists a computational framework translating well-characterized input variations into output variations. In (2), the figures of merit are defined for the process, for which tolerance limits are to be established and a comparison made with defined acceptance criteria. In the embodiment of the LOCA accident, the figures of merit are PCT, MLO, and CWO. In (3), the fraction of the population which must satisfy the acceptance criteria is defined. The objective of the methodology is to define upper tolerance limits for the process with respect to the figures of merit, demonstrating that those upper tolerance limits satisfy, e.g., remain below, a set of acceptance criteria, demonstrating that the required fraction of the population satisfies the acceptance criteria.

As shown in (4) of FIG. 1, the sample size is defined, and the sequence of steps to be used in the sequential embedding process is also defined. The methodology defines the sample size and sequence prior to generating a random sample, in order for the calculation of achieved confidence level to remain valid.

In (4a) of FIG. 1, the sequential embedding sequence steps are defined to either allocate or remove asymmetry in the resulting tolerance limits. To optimize the tolerance limit for a particular figure of merit (allocate asymmetry to that figure of merit), the figure of merit appears more often and later in the defined sequence. To minimize asymmetry among the figures of merit, they all appear with equal frequency in the sequence, and in rotating order (e.g. 1, 2, 3, 4, 1, 2, 3, 4, 1, 2, 3, 4, . . . )

In (5) of FIG. 1, a random sample of N observations is taken from the population, either by random sampling from the physical population of the controlled process or by random simulation of the computational model representing the controlled process.

In (6) of FIG. 1, the sample of N observations is processed using the sequential embedding sequence defined in (4) and (4a) to define the tolerance limits for the population. Those tolerance limits are then compared to the acceptance criteria in (6a) of FIG. 1.

Instead of defining tolerance limits in each dimension, e.g., figure of merit, successively as in the established Wald (1943) embodiment, e.g., taking P steps to cover P dimensions, the methodology according to the invention implements a "sequential embedding" process in which K individual steps are taken to define and update tolerance limits among the dimensions. In each step, the most extreme (upper or lower) observation remaining in the dimension is used to define/update the tolerance limit in that dimension. The most extreme observation is discarded from the sample, and in the next step the remaining observations in the sample are used to establish an upper or lower tolerance limit for the dimension. The process is repeated for a total of K steps (observations) while ensuring that an upper and/or lower tolerance limit is defined in each dimension. When applying the "sequential embedding" technique, the number of allowable steps (K) will be defined by the sample size and the desired probability and confidence levels, and will be independent of the number of dimensions.

Equation 22 of Guba, Makai, and Pal (2003) provides a generalized formulation for determining the confidence level associated with tolerance limits for a population with multiple outcomes (dimensions or figures of merit):

$$\beta = 1 - I(\gamma, s_p - r_p, N - (s_p - r_p) + 1) \quad (1)$$

wherein, $\beta$ is the confidence level, $\gamma$ is the fraction of the population to be bounded by the tolerance limits (probability), N is the number of observations in the sample, and $s_p$ and $r_p$ reflect the upper and lower observations in the p-dimensional space representing joint tolerance limits. In the context of Equation 1, each observation x in the sample of dimension p can be expressed as x(i, j), where i=1, 2, . . . , p and j=1, 2, . . . N. In Equation (1):

$$I(\gamma, j, k) = \int_0^\gamma \frac{u^{j-1}(1-u)^{k-1}}{B(j,k)} du \quad (2)$$

$$B(j \cdot k) = \frac{(j-1)!(k-1)!}{(j+k-1)!} \quad (3)$$

Setting $K=(s_p-r_p)$ in Equation (1), the following results:

$$\beta = 1 - I(\gamma, N-K+1, K) = \sum_{j=0}^{N-K} \binom{N}{j} \gamma^j (1-\gamma)^{N-j} \quad (4)$$

where $$K = \sum_{i=1}^P k_i \quad (5)$$

wherein, $k_i$ represents the number of steps in the sequential embedding sequence allocated to each dimension, and K represents the total number of steps in the sequential embedding sequence. $K=(s_p-r_p)$ for the multi-dimensional set of tolerance limits can then be interpreted analogously to the one-dimensional set (Equation (16) of Guba, Makai, and Pal (2003)), where the number of observations in the original sample not within the tolerance limits is equal to K.

Figure 2:
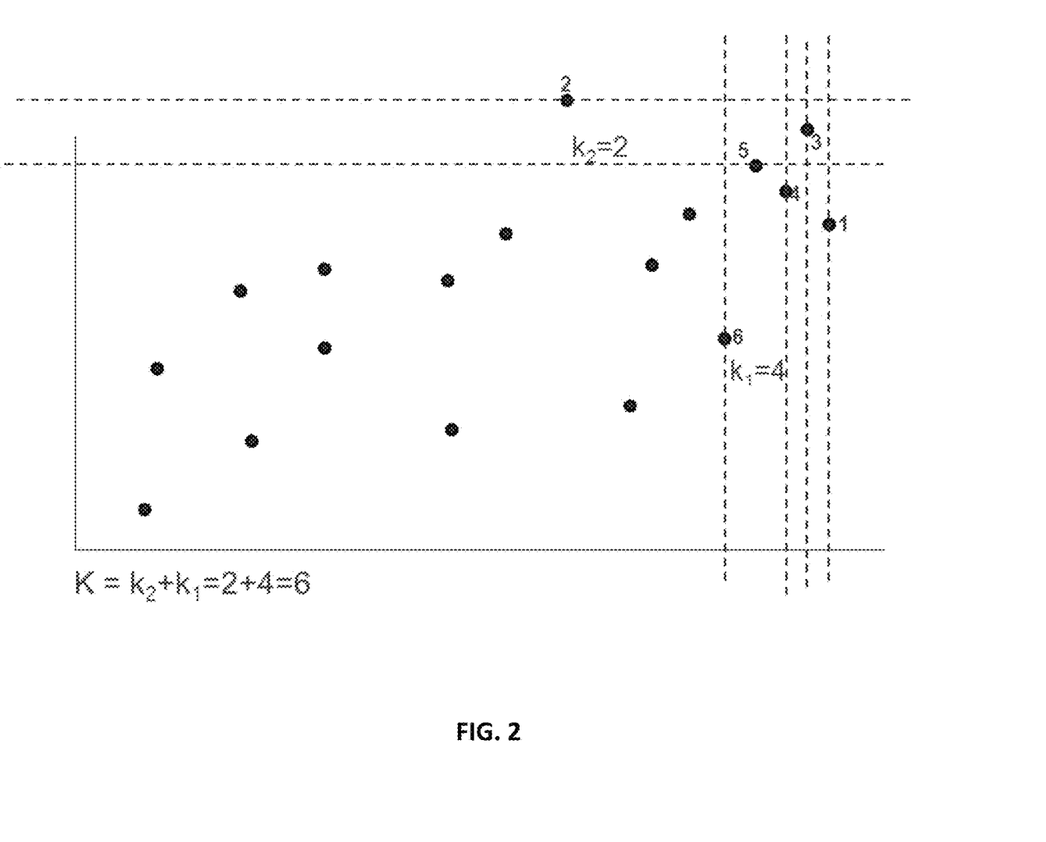
FIG. 2 is a plot that shows a hypothetical portion of a sample for which K=6 is established to result in the desired confidence level $\beta$ that bounds a desired portion of population $\gamma$ for two dimensions, i.e., '1' dimension (x-axis) and '2' dimension (y-axis, in accordance with certain embodiments of the invention.

FIG. 2 illustrates a sequential embedding process in accordance with certain embodiments of the invention. FIG. 2 shows a hypothetical portion of a sample for which K=6 in Equation (4) has been established to result in the desired confidence level $\beta$ that bounds a desired portion of the population $\gamma$. In this example, there are two dimensions, the '1' dimension (x-axis) and the '2' dimension (y-axis). The pre-defined embedding sequence is: 1, 2, 1, 1, 2, 1, so $k_1=4$, $k_2=2$, and K=6. As shown, there are a total of 6 points not bounded by the upper tolerance limits ultimately established by the last steps (points 5 and 6), corresponding to the group of points used in the sequential embedding steps.

The "sequential embedding" process according to the invention results in tolerance limits which are retrospectively supported by the theorems and proofs in Wald (1943), such that the final tolerance limits defined by the K individual steps can be described as if they had been derived using N steps for the N dimensions according to the more typical embodiment of the theory. But the "sequential embedding" approach to defining those limits has the potential to advantageously control the level of 'asymmetry' as mentioned by Wald (1943).

The invention provides techniques that define the combinations of a sample size (N) and the total number of steps (K), which successfully bound 95% of the population with 95% confidence, for example.

The sequence of steps can include the definition of a tolerance limit in the $P_1$ dimension, then a limit in the $P_2$ dimension, and then a limit again in the $P_1$ dimension, as defined by the sequence shown in FIG. 2. Here, the confidence level associated with the joint tolerance limits is defined by the total number of steps taken (K), and those K steps are taken one-at-a-time using the most extreme point (upper or lower) for a particular dimension remaining in the sample to update/define the (upper or lower) tolerance limit for that dimension. The manner in which the K steps are allocated to the multiple dimensions defines a processing sequence which will control the symmetry or asymmetry in the resulting multi-dimensional tolerance limits. As such, tolerance limits in each dimension can be more or less bounding than in other dimensions, as desired. Alternatively, the asymmetry inherent in the established P-step "embedding" process can be minimized using instead K individual steps spread over the dimensions equally.

As illustrated by (4a) in FIG. 1, the processing sequence is defined in a manner consistent with the objectives of the analysis, according to the following general rules:
  (i) To remove asymmetry in the resulting tolerance limits, each dimension should appear equally in the sequence both in number and in placement, for example: 1, 2, 3, 1, 2, 3, 1, 2, 3; and
  (ii) To allocate or control asymmetry for a more refined result in any particular dimension, that dimension should appear more frequently and later in the sequence; for example, to refine the tolerance limit in the '1' dimension while still addressing the '2' and '3' dimension: 3, 2, 1, 1, 1, 1.

Figure 3:
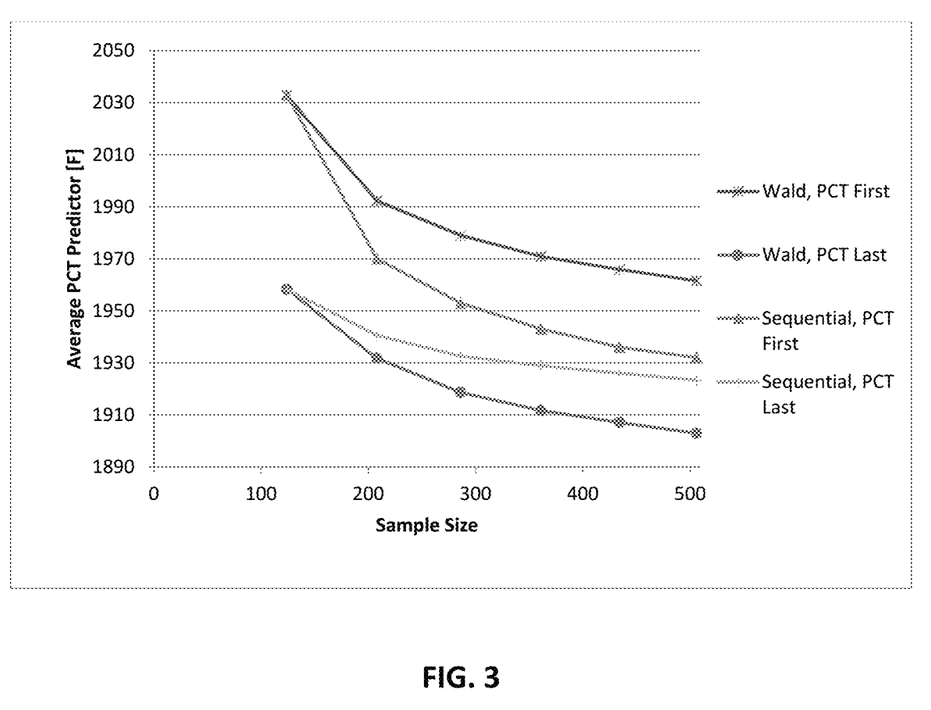
FIG. 3 is a plot that shows the advantages of the "sequential embedding" technique according to the invention, for the particular embodiment of an example population of LOCA results.

FIG. 3 illustrates the advantages of the "sequential embedding" technique according to the invention, for the particular embodiment of an example population of LOCA results. The series in the figure identified as 'Wald' uses the traditional embedding approach described in Wald (1943) and Guba (2003), in which P steps are taken to create limits for the P dimensions. In this case, for the LOCA analysis, P=3 for the three LOCA figures of merit (i.e., PCT, MLO, and CWO). As illustrated, a 'PCT First' approach tends to lead to higher (more extreme) results for the PCT 'dimension,' while a 'PCT Last' approach provides lower results. This is representative of the asymmetry referred to in Wald (1943).

In FIG. 3, the "sequential embedding" described by the invention is represented by the 'Sequential' series. In this embodiment, the sequence is either 'CWO, MLO, PCT, CWO, MLO, PCT . . . ' for the 'PCT Last' case or PCT, MLO, CWO, PCT, MLO, CWO . . . ' for the 'PCT First' case. As the sample size is larger and more iterations among the K steps are performed with the other dimensions, the asymmetry is advantageously reduced. The 'PCT First' and 'PCT Last' choices for sequential embedding tend to be nearly the same with a sample size around 500, while the traditional embedding technique retains its large asymmetry.

As stated in (5) of FIG. 1, a number of observations, e.g., N, is selected to acquire a random sample from the population of outputs and in (6), the sample is processed according to the pre-defined sequential embedding sequence.

Figure 4:
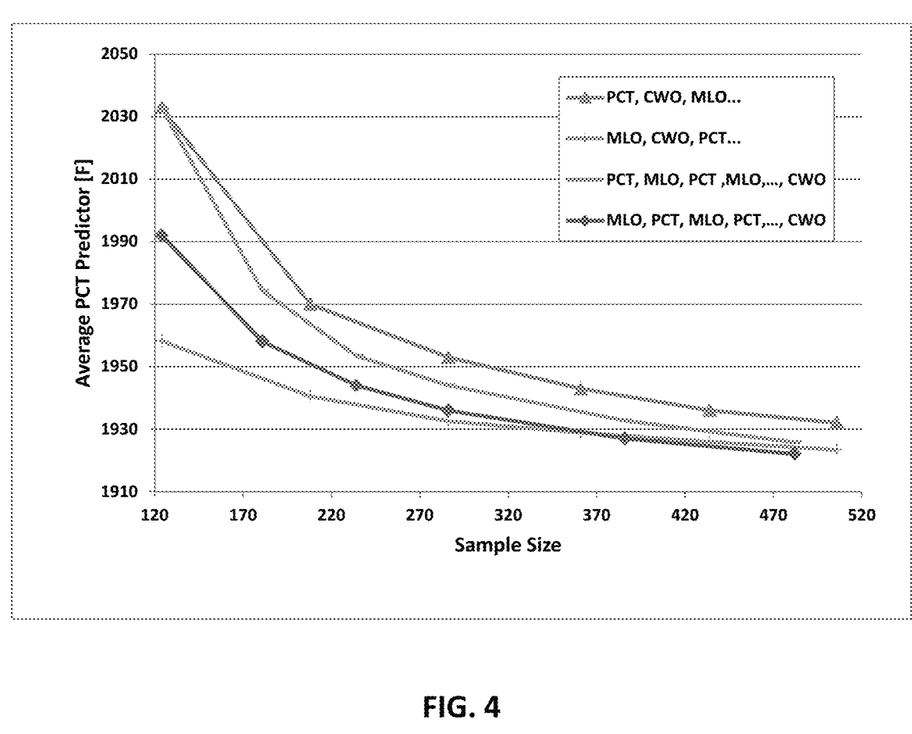
FIG. 4 is a plot that shows the ability to control the asymmetry in a multi-dimensional tolerance by adjusting the sequence used in the K-step sequential embedding process.

FIG. 4 illustrates the ability to control the asymmetry in the multi-dimensional tolerance by adjusting the sequence used in the K-step sequential embedding process. More or less conservatism can be allocated to a particular dimension by adjusting its place and frequency of occurrence in the sequence. This can be advantageous to either reduce the asymmetry identified by Wald (1943) or to strategically allocate asymmetry as desired.

The "sequential embedding" technique according to the invention has applications for a wide variety of problems in which tolerance (process or control) limits must be defined for a population with multiple dimensions of interest with a particular confidence level. Examples include, but are not limited to:
  i) demonstration that a fraction of postulated accidents meets multiple safety analysis limits (e.g. the particular embodiment described in the LOCA example where temperature and oxidation limits must be met);
  ii) demonstration that a fraction of manufactured specimens meets tolerance limits for multiple criteria (e.g. length, width, and roughness requirements); and
  iii) demonstration that a fraction of produced specimens meets performance requirements for multiple criteria (e.g. engine power, torque, and specific fuel consumption ratings).

Other examples are contemplated within the spirit and scope of this disclosure.

Generally, according to the invention, the sequence in which the tolerance limits are to be defined can be established to either minimize asymmetry or strategically allocate asymmetry. For the particular embodiment of LOCA safety analysis limits, the most stringent area of concern is typically PCT and therefore, PCT should appear most often and latest in the processing sequence. In a particular embodiment of an engine performance, the most stringent area is typically assurance that the specific fuel consumption requirements are met and therefore, this parameter should appear most often and latest in the processing sequence. Furthermore, to ensure that the desired confidence level is met when stating that the defined tolerance limits bound a certain fraction of the population, the sample size and the processing sequence are defined prior to the processing of the sample results.

The "sequential embedding" method advantageously processes a sample in a manner supported by the Wald (1943) proofs but addresses the 'asymmetry' in a new and unique manner. Asymmetry can intentionally be increased or reduced, depending on the goals of the statistical test being performed.

The "sequential embedding" method provides flexibility in defining sequences. The order in which the dimensions are processed, and the frequency in which they are processed among the K-steps, can advantageously be chosen to strategically achieve the goals of the statistical analysis.

As shown in (6a) of FIG. 1, the final step of the methodology is comparing the established (upper and/or lower) tolerance limits against the established acceptance criteria.

In certain embodiment of the invention, computational systems are provided for performing safety analyses, such as, that of a population of postulated Loss of Coolant Accidents (LOCAs) in a nuclear reactor, are used in conjunction with the step-wise iterative tolerance limit definitions to confirm acceptance criteria are met.

Whereas particular embodiments of the invention have been described herein for purposes of illustration, it will be evident to those skilled in the art that numerous variations of the details may be made without departing from the invention as set forth in the appended claims.

We claim:

1. A computational method of establishing tolerance limits for a population of a controlled process with multiple figures of merit, comprising:
  defining the figures of merit;
  establishing acceptance criteria for the figures of merit, wherein the acceptance criteria is a safety limit or a performance requirement for the controlled process;
  establishing a required fraction of the population, $\gamma$, to satisfy the acceptance criteria;
  establishing a required confidence level, $\beta$, for the tolerance limits;
  confirming that the required fraction of the population, $\gamma$, satisfies the acceptance criteria prior to operation of the controlled process, comprising:
    defining a number of observations, N, to comprise a sample of the population;
    calculating a number of steps, K, in a sequential embedding sequence;

processing the sample according to the sequential embedding sequence such that the required fraction of the population, γ, is bounded by the tolerance limits with the required confidence level, β:

$$\beta = 1 - I(\gamma, N - K + 1, K) = \sum_{j=0}^{N-K} \binom{N}{j} \gamma^j (1-\gamma)^{N-j}$$

where $K = \sum_{i=1}^{p} k_i$ wherein, β is confidence level, γ is fraction of the population bounded by the tolerance limits, N is the number of observations in the sample, $k_i$ represents the total number of steps in the sequential embedding sequence allocated to each dimension, p represents the total number of dimensions, and K represents the total steps taken in the sequential embedding sequence;

selecting the figures of merit for which upper and/or lower tolerance limits are defined for each step in the sequential embedding sequence;

randomly drawing N observations from the population to comprise the sample;

establishing upper and/or lower tolerance limits for each of the figures of merit;

(a) for each step in the sequential embedding sequence, defining the upper and/or lower tolerance limits for the figure of merit as defined in a current step of the sequential embedding sequence, comprising:

ranking the observations in the sample according to their values for the figure of merit;

defining upper and/or lower tolerance limits for the figure of merit as the value of the figure of merit for a highest and/or lowest, respectively, ranked observation in the sample; and reducing the sample for subsequent steps of the sequential embedding sequence by discarding the most extreme observation that is used to define the tolerance limits in the current step;

(b) repeating the actions of (a) in an iterative stepwise order for the K steps in the sequential embedding sequence to define a final set of upper and/or lower tolerance limits for the multiple figures of merit defined for the population, wherein asymmetry of the multiple figures of merit is controlled by the frequency and positioning of each figure of merit in the iterative sequence steps;

confirming if the final tolerance limits satisfy the acceptance criteria; and setting the tolerance limits of the operation of the controlled process according to the final tolerance limits that met the acceptance criteria.

2. The computational method of claim 1, wherein the figure of merits are peak cladding temperature (PCT), maximum local oxidation (MLO) and core-wide oxidation (CWO) for a loss of coolant accident (LOCA) analysis.

3. The computational method of claim 1, wherein the tolerance limits for a specified figure of merit is optimized by having the specified figure of merit appear more often and later relative to other figures of merit in the sequential embedding sequence.

4. The computational method of claim 1, wherein the asymmetry is minimized by assigning equal appearances to each figure of merit in the iterative sequence steps and rotating each figure of merit in the iterative sequence steps.

* * * * *